United States Patent [19]

Shigeura

[11] Patent Number: 5,679,076
[45] Date of Patent: Oct. 21, 1997

[54] FLEXIBLE GEAR COUPLING

[75] Inventor: Junichi Shigeura, Amagasaki, Japan

[73] Assignee: Mitsubishi Denki Kabushiki Kaisha, Tokyo, Japan

[21] Appl. No.: 420,076

[22] Filed: Apr. 11, 1995

[30] Foreign Application Priority Data

Apr. 15, 1994 [JP] Japan .................. 6-077251

[51] Int. Cl.$^6$ .................. F16C 1/24; F16D 3/18
[52] U.S. Cl. .................. 464/16; 464/154
[58] Field of Search .................. 464/7, 16, 153, 464/157, 158

[56] References Cited

U.S. PATENT DOCUMENTS

| | | | |
|---|---|---|---|
| 2,158,947 | 5/1939 | Baumann | 464/7 X |
| 2,510,414 | 6/1950 | Philbrick | 464/154 |
| 2,593,654 | 4/1952 | Bouvat-Martin . | |
| 2,935,860 | 5/1960 | Miller | 464/16 |
| 2,943,463 | 7/1960 | Shipley | 464/16 |
| 2,964,929 | 12/1960 | Hoffman | 464/16 |
| 3,003,008 | 10/1961 | Wong | 464/16 |
| 3,117,430 | 1/1964 | Mueller | 464/154 X |
| 3,298,199 | 1/1967 | Grey | 464/16 |
| 3,402,572 | 9/1968 | Chase et al. | 464/154 |

FOREIGN PATENT DOCUMENTS

| | | | |
|---|---|---|---|
| 704 329 | 5/1931 | France . | |
| 2 429 372 | 1/1980 | France . | |
| 836 131 | 4/1952 | Germany . | |
| 905212 | 3/1954 | Germany | 464/154 |
| 1138286 | 10/1962 | Germany | 464/153 |
| 33 03 929 | 7/1984 | Germany . | |
| 47-14804 | 5/1972 | Japan . | |
| 60-168920 | 9/1985 | Japan | 464/16 |
| 570532 | 8/1977 | U.S.S.R. | 464/153 |
| 1525359 | 11/1989 | U.S.S.R. | 464/16 |
| 1612144 | 12/1990 | U.S.S.R. | 464/16 |
| 121 092 | 12/1918 | United Kingdom . | |

*Primary Examiner*—Daniel P. Stodola
*Assistant Examiner*—Eileen A. Dunn
*Attorney, Agent, or Firm*—Oblon, Spivak, McClelland, Maier & Neustadt, P.C.

[57] ABSTRACT

A flexible gear coupling which stirs the enclosed lubricant to extend the life of the lubricant. A stirring device is made of elastic material and has a first part which is fixed either to a sleeve or a pinion and a movable part which is moved by centrifugal force. The movable portion moves in the inner peripheral direction of the sleeve when the rotary shaft moves the gears. The movable portion is positioned within the enclosed lubricant. When the speed of the rotary shaft changes, the movable portion changes position and also moves the lubricant so as to gradually mix the lubricant.

5 Claims, 5 Drawing Sheets

FLEXIBLE GEAR COUPLING

BACKGROUND OF THE INVENTION

The present invention relates to a flexible gear coupling capable of coupling a drive motor of a railway vehicle with a reduction gear unit.

A drive motor of a railway vehicle is disposed on a bogie frame and a reduction gear unit is disposed to an axle shaft. Therefore, the axial line of the output shaft of the motor is dislocated from that of the pinion shaft of the gear unit by the vibration of a body when the railway vehicle travels. Since a power must be smoothly delivered between both shafts even in the dislocated state, the motor is coupled with the gear unit through a flexible gear coupling.

FIG. 10 is a front elevational view, partly in cross section, of a conventional flexible gear coupling disclosed in, for example, Japanese Utility Model Publication No. 47-14804. In FIG. 10, numeral 1 denotes rotary shafts with one of them serving as, for example, the output shaft of a drive motor and the other of them serving as the input shaft to a reduction gear unit. Numeral 2 denotes pinions each fixed to the rotary shaft 1 and an external gear having crown teeth 2a is formed to each of the pinions 2. Numeral 3 denotes sleeves fixed to each other by bolts or the like and each sleeve 3 has the teeth 3a of an internal gear to be meshed with the teeth 2a of the pinion 2. Note, the vicinity of the portion where both gears 2a and 3a in the sleeves 3 are meshed each other is filled with grease as a lubricant.

Numeral 4 denotes end covers each fixed to the sleeve 3 to prevent the splashing of the grease in the sleeve 3. Numeral 5 denotes center plates each partitioning the interior of the sleeve 3, numeral 6 denotes shaft end nuts to prevent the pinions 2 from dropping off the rotary shafts 1. Numeral 7 denotes cushions to prevent the shaft end nuts 6 from being abutted against the center plates 5 and damaging them.

As described above, the conventional flexible gear coupling is arranged symmetric with respect to the center plates 5 in the right to left direction.

Since the conventional flexible gear coupling is arranged as described above, even if the axial line of the output shaft of the motor is dislocated or misaligned from that of the pinion shaft of the gear unit by the vibration of the body when the railway vehicle travels, a drive force can be smoothly transmitted from one of the rotary shafts 1 to the other of them because the teeth 2a of the external gears of the pinions 2 are crowned. Further, even if both rotary shafts 1 are dislocated in an axial direction, the teeth 2a of the external gears 2 of the pinions 2 freely move along the grooves of the teeth 3a of the internal gear formed in the sleeves 3.

Note, recently there is a tendency that grease having a low flowing property is used as the lubricant to prevent leakage. The grease is caused to adhere on the inner surface of the sleeves 3 like a doughnut by the centrifugal force produced by the rotation the rotary shafts 1 and does not flow down and keeps the adhered state as it is even if the rotation of the rotary shafts 1 stops. Further, the grease other than that located in the vicinity of the portion where the teeth are meshed does not move and keeps the state that it adheres to the same position while the rotary shafts 1 rotate.

Since the conventional flexible gear coupling is arranged as described above, although a less amount of a lubricant leaks, since the lubricant has a low flowing property, the circulation of the lubricant at the portion where teeth are meshed with the lubricant at the portion other than the above cannot be almost expected. Therefore, since it is only a part of the lubricant located in the vicinity of tooth surfaces that contributes to lubrication, there is a problem that an efficiency of using the lubricant is lowered and the lubricant must be entirely replaced even if it is partially deteriorated.

SUMMARY OF THE INVENTION

Accordingly, an object of the present invention is to solve the above problem and has as its object the provision of a flexible gear coupling capable of forcibly circulating the lubricant.

With the above object in view, the present invention resides in a flexible gear coupling arranged such that a pair of external gears provided with pinions are crowned in order that when a pair of internal gears disposed along the same axis of sleeves are meshed with the external gears, the external gears can move in the axial direction of the internal gears by a predetermined amount as well as incline toward the axial direction of the internal gears at a predetermined angle. A lubricant is filled in the vicinity of the portion where the internal gears are meshed with the external gears. A rotational force is transmitted from a first rotary shaft fixed to one of the pinions to a second rotary shaft fixed to the other of the pinions. The flexible gear coupling comprises stirring members each composed of an elastic body and having a fixing portion fixed to the sleeve in the sleeve and movable portions capable of being moved in the inner peripheral direction of the sleeve by a centrifugal force caused by the rotation of each of the rotary shafts and disposed at a position where the lubricant exists.

The stirring member may be formed to a comb shape and fixed along the inner surface of the sleeve.

A flexible gear coupling may also be arranged such that a pair of external gears provided with pinions are crowned in order that when a pair of internal gears disposed along the same axis of sleeves are meshed with the external gears, the external gears can move in the axial direction of the internal gears by a predetermined amount as well as incline toward the axial direction of the internal gears at a predetermined angle, a lubricant is filled in the vicinity of the portion where the internal gears are meshed with the external gears, and a rotational force is transmitted from a first rotary shaft fixed to one of the pinions to a second rotary shaft fixed to the other of the pinions, the flexible gear coupling comprises stirring members each composed of an elastic body and having a fixing portion fixed to the sleeve in the sleeve and movable portions capable of being moved by an inertial force caused by the change of an acceleration produced by the rotation of each of the rotary shafts and disposed at a position where the lubricant exists.

Also, a flexible gear coupling may be arranged such that a pair of external gears provided with pinions are crowned in order that when a pair of internal gears disposed along the same axis of sleeves are meshed with the external gears, the external gears can move in the axial direction of the internal gears by a predetermined amount as well as incline toward the axial direction of the internal gears at a predetermined angle, a lubricant is filled in the vicinity of the portion where the internal gears are meshed with the external gears, and a rotational force is transmitted from a first rotary shaft fixed to one of the pinions to a second rotary shaft fixed to the other of the pinions, the flexible gear coupling comprises stirring members each having a fixing portion fixed to the pinion in the sleeve and abutting portions extending from the fixing portion in the direction of the inner periphery of the sleeve and disposed at a position where the lubricant exists.

The abutting portions of the stirring member may be inclined at a predetermined angle in the direction where the internal gear is meshed with the external gear.

The abutting portions of the stirring member are alternately inclined at a predetermined angle in the direction where the internal gear is meshed with the external gear and the direction opposite to the above direction.

According to the present invention, the lubricant is forcibly moved because the movable portions are moved by the change of the rotational speed of each of the rotary shafts by the provision of the stirring members each composed of an elastic body and having a fixing portion fixed to the sleeve in the sleeve and movable portions capable of being moved in the inner peripheral direction of the sleeve by a centrifugal force caused by the rotation of each of the rotary shafts and disposed at a position where the lubricant exists.

Also, since the stirring member is formed to a comb shape and fixed along the inner periphery of the sleeve, the flexible gear coupling can be easily made in addition to the operation.

The lubricant is forcibly moved because the movable portions are moved by the change of an acceleration by the provision of the stirring members each composed of an elastic body and having a fixing portion fixed to the sleeve in the sleeve and movable portions capable of being moved by an inertial force caused by the change of an acceleration produced by the rotation of each of the rotary shafts and disposed at a position where the lubricant exists.

The lubricant is forcibly moved by the abutting portions when the pinion moves in the axial direction of the sleeve and when the pinion inclines toward the axial direction at a predetermined angle by the provision of the stirring members each having a fixing portion fixed to the pinion in the sleeve and abutting portions extending from the fixing portion in the direction of the inner periphery of the sleeve and disposed at a position where the lubricant exists.

The movement of the lubricant is further accelerated because the lubricant is stirred by the abutting portions when the pinion moves or inclines by the arrangement that the abutting portions of the stirring member are inclined at a predetermined angle in the direction where the internal gear is meshed with the external gear.

According to another aspect of the present invention, the movement of the lubricant is further accelerated because the lubricant is stirred by the abutting portions when the pinion moves or inclines by the arrangement that the abutting portions of the stirring member are alternately inclined at a predetermined angle in the direction where the internal gear is meshed with the external gear and the direction opposite to the above direction.

BRIEF DESCRIPTION OF THE DRAWINGS

The present invention will become more readily apparent form the following detailed description of the preferred embodiments taken in conjunction with the accompanying drawings, in which.

DESCRIPTION OF THE PREFERRED EMBODIMENTS

Figure 1:
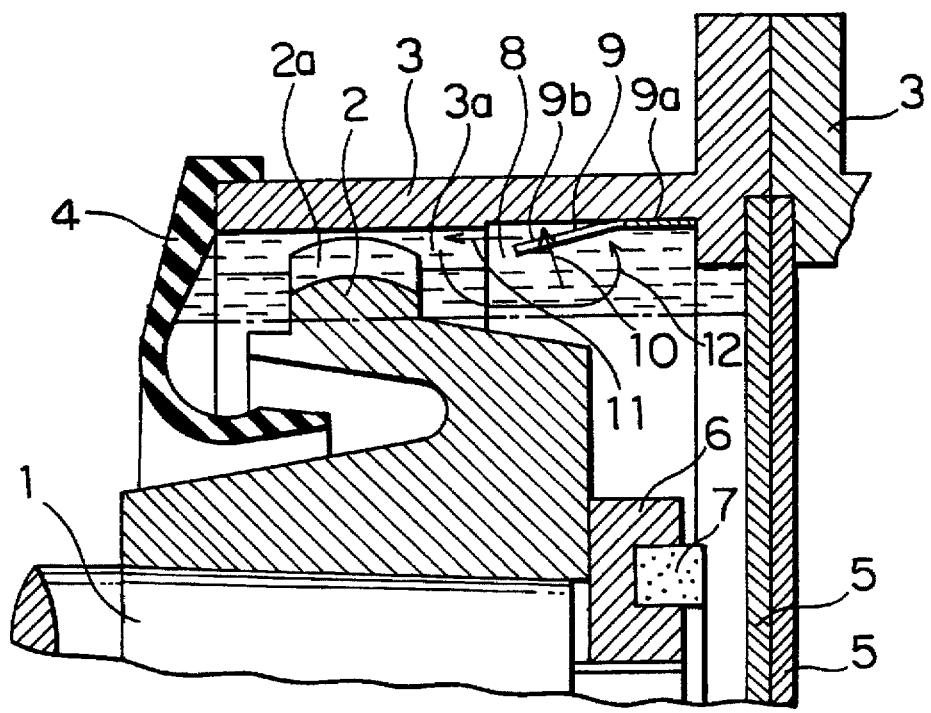
FIG. 1 is a cross sectional view of the main portion of a first embodiment of the present invention.
Figure 2:
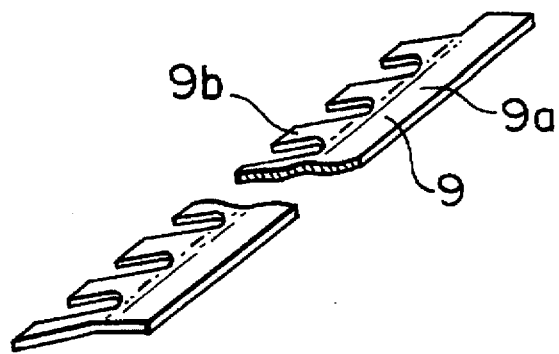
FIG. 2 is a perspective view showing a stirring member of FIG. 1 when it is developed.

A first embodiment of the present invention will be described below with reference to drawings. FIG. 1 is a cross sectional view showing the main portion of the first embodiment. FIG. 2 is a perspective view of a stirring member of FIG. 1. In FIG. 1 and FIG. 2, numerals 1–7 denote the same components as those of prior art. Numeral 8 denotes a lubricant filled in the vicinity of the portion where the teeth 2a of an external gear are meshed with the teeth 3a of an internal gear, and grease having a low flowing property is generally used to prevent leakage.

Numeral 9 denotes the stirring member composed of an elastic body and having a fixing portion 9a fixed to a sleeve 3 in the sleeve 3 and the stirring member 9 also has comb-shaped movable portions 9b. Further, the movable portions 9b are disposed at a position where the lubricant 8 exists and arranged to be able to move in the inner peripheral direction of the sleeve 3 by the centrifugal force produced by the rotation of the a rotary shaft 1. Note, the stirring member 9 is composed of the elastic body such as metal, plastic or the like formed to the comb shape and the comb portion thereof is bent at a predetermined angle.

Next, the operation of the device will be described. In FIG. 1. a pinion 2 and the sleeve 3 are integrally rotated by the rotation of the rotary shaft 1. When the sleeve 3 rotates, the movable portions 9b of the stirring member 9 are deflected and moved toward the inner peripheral direction of the sleeve 3 as shown by an arrow 10 by a centrifugal force. Then, the lubricant 8 existing between the sleeve 3 and the movable portions 9b is pushed out in the direction of an arrow 11 by the movement of the movable portions 9b and fed in the direction of the teeth 3a of the internal gear.

When the rotary shaft 1 stops or the rotational speed thereof is lowered, the movable portions 9b move in the direction for enabling it to return to its original position. With this movement, the lubricant 8 in the vicinity of the sleeve 3 and the movable portions 9b is sucked therebetween. At the time, a slight amount of the lubricant 8 is returned in the direction opposite to that of the arrow 11. Since the movement of the movable portions 9b is repeated, however, the lubricant 8 existing between a center plate 5 and the teeth 3a gradually circulates as shown by an arrow 12.

With the above operation, the lubricant 8 in the vicinity of the portion where both teeth 2a and teeth 3a are meshed each other is mixed with the lubricant 8 circulating in the direction of the arrow 12 by the rotation of the rotary shaft 1, and as a time elapses, the entire lubricant 8 is gradually mixed.

As described above, since the lubricant 8 at respective portions circulates while being mixed and can be effectively used as a whole, the life of the lubricant 8 can be greatly extended.

Figure 3:
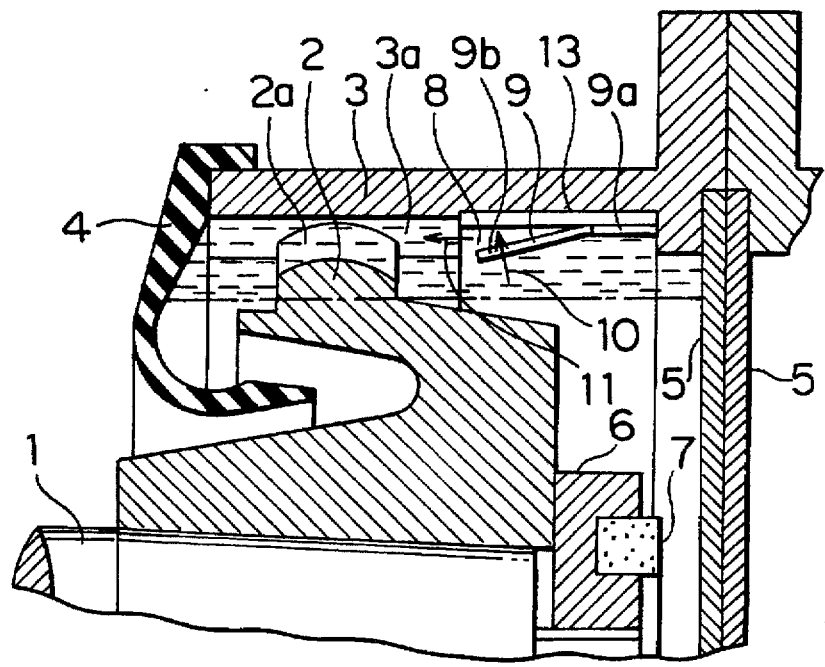
FIG. 3 is a cross sectional view showing the main portion of a second embodiment.

FIG. 3 is a cross sectional view snowing the main portion of a second embodiment. In FIG. 3, numeral 13 denotes a spacer interposed between a sleeve 3 and a stirring member 9 to adjust the height of the stirring member 9 so that a lubricant 8 can circulate well. Note, when the spacer 13 is composed of a non-metal material, the wear of the stirring member 9 and movable portions 9b can be prevented when they come into contact with each other.

Figure 4:
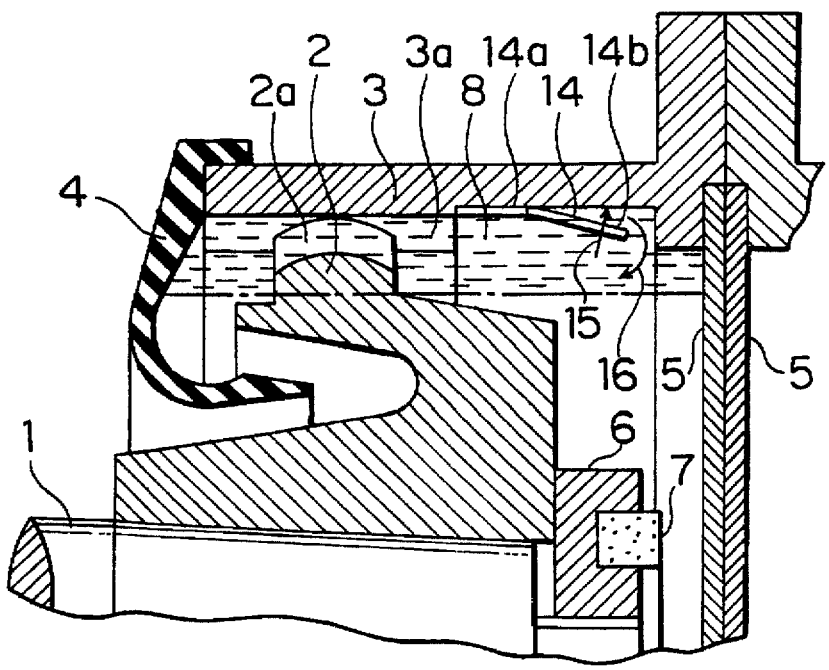
FIG. 4 is a cross sectional view showing the main portion of a third embodiment.

FIG. 4 is a cross sectional view showing the main portion of a third embodiment. In FIG. 4, numeral 14 denotes a stirring member similar to that of the stirring member 9 shown in FIG. 1, and the stirring member 14 is fixed in a direction reverse to that of the stirring member 9, that is, a fixing portion 14a is fixed to a sleeve 3 and movable portions 14b are disposed in the direction opposite to the portion where both teeth 2a and teeth 3a are meshed each other. Note, the movable portions 14b are disposed at a position where the lubricant 8 exists.

In the above arrangement, when the movable portions 14b move in the direction of an arrow 15 by a centrifugal force, the lubricant 8 existing between the sleeve 3 and the movable portions 14b are pushed out in the direction of an arrow 16 and circulates similarly to the case of FIG. 1.

Figure 5:
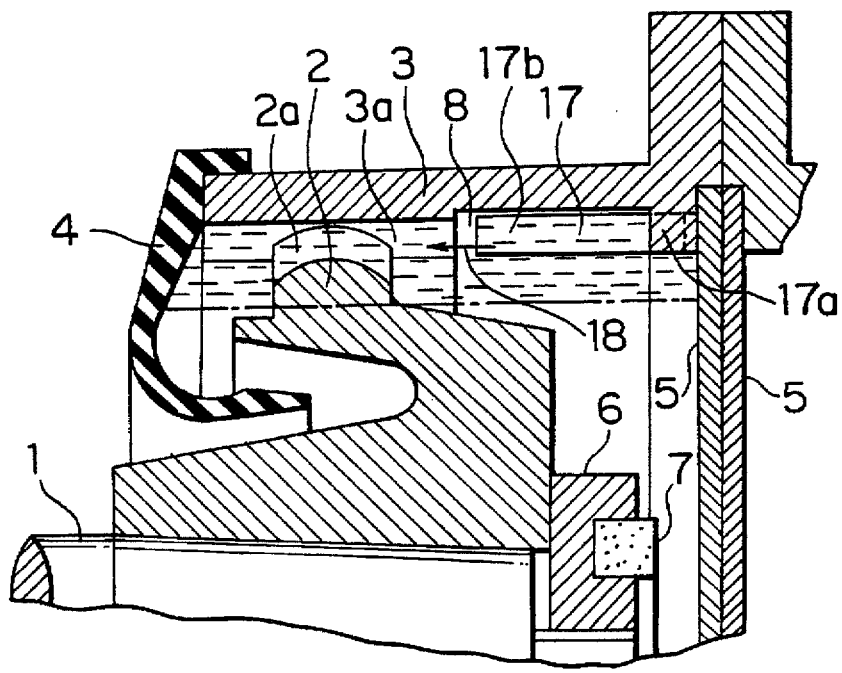
FIG. 5 is a cross sectional view showing the main portion of a fourth embodiment.

FIG. 5 is a cross sectional view showing the main portion of a fourth embodiment. In FIG. 5, numeral 17 denotes a stirring member composed of a plate-shaped elastic body and having a fixing portion 17a fixed to the side of the center plate 5 of a sleeve 3 and movable portions 17b disposed in the direction where teeth 2a are meshed with teeth 3a. Further, the movable portions 17b are disposed at a position where a lubricant 8 exists. Note, a plurality of the stirring members 17 are disposed at a predetermined interval in the peripheral direction of a sleeve 3 and deflected in a peripheral direction by an inertial force caused by the change of an acceleration produced by the rotation of the sleeve 3 and move the lubricant 8 in the direction of an arrow 78.

With the above arrangement, since the lubricant 8 in the vicinity of the portion where the teeth 2a are meshed with the teeth 3a are moved by the stirring member 14 as the sleeve 3 rotates, the entire lubricant 8 is gradually mixed. Consequently, since the lubricant 8 can be effectively used as a whole, the life of the lubricant 8 can be greatly extended.

Figure 6:
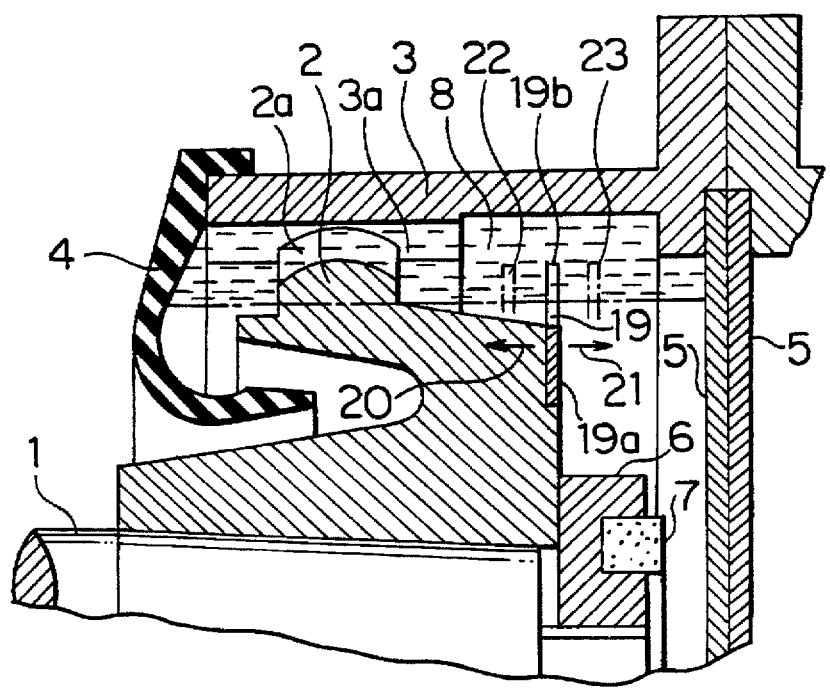
FIG. 6 is a cross sectional view showing the main portion of a fifth embodiment.
Figure 7:
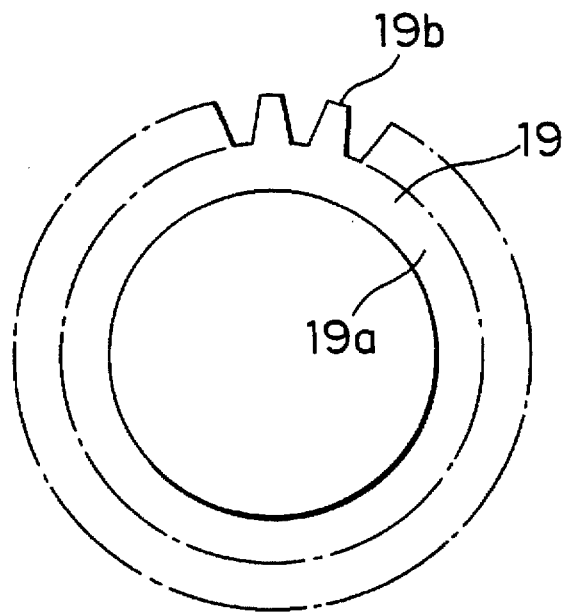
FIG. 7 is a side elevational view showing a stirring member of FIG. 6.

FIG. 6 is a cross-sectional view sowing the main portion of a fifth embodiment. FIG. 7 is a side elevational view showing a stirring member of FIG. 6. In FIG. 6 and FIG. 7, numeral 19 denotes a stirring member having an fixing portion 19a fixed to an end of a pinion 2 and comb-shaped abutting portions 19b as shown in FIG. 7 radially extending in the direction of the inner peripheral surface of a sleeve 3 and the abutting portions 19b are located at a position where a lubricant 8 exists.

In the arrangement of FIG. 6, the lubricant 8 can be moved by the movement of the pinion 2 to a position 22 or a position 23 in the axial direction of the sleeve 3 as shown by arrows 20 and 21. Since the entire lubricant 8 is gradually mixed by this arrangement, the lubricant 8 can be effectively used as a whole. As a result, the life of the lubricant 8 can be greatly extended.

Although the stirring member 19 fixed to the end of the pinion 2 is described in FIG. 6, the same advantage can be expected when the stirring member 19 is pressed against the pinion 2 by an axis end nut 6.

Figure 8:
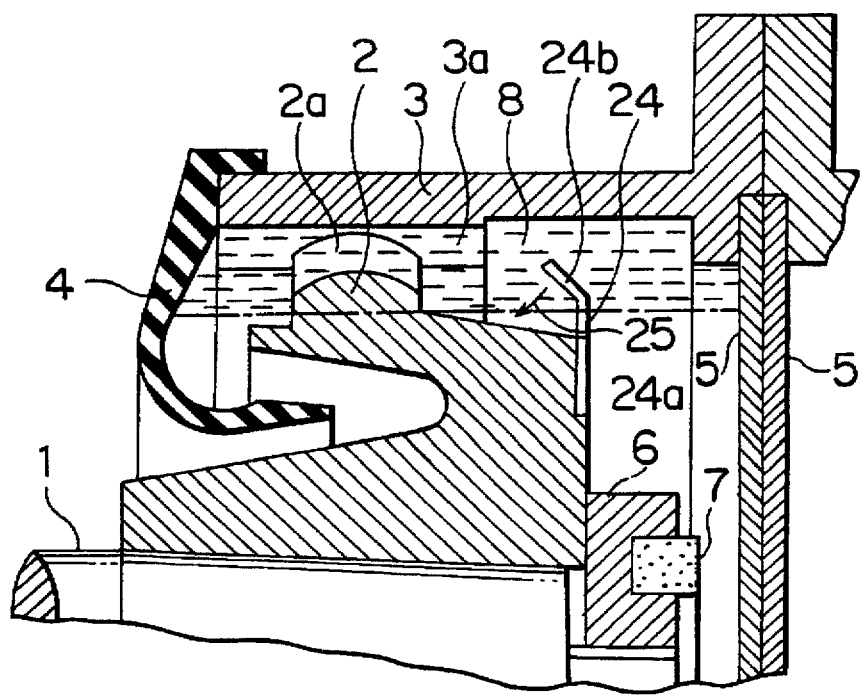
FIG. 8 is a cross sectional view showing the main portion of a seventh embodiment.

FIG. 8 is a cross sectional view showing the main portion of a seventh embodiment. In FIG. 8, numeral 24 denotes a stirring member having a fixing portion 24a fixed to an end of a pinion 2 and comb-shaped abutting portions 24b similar to those of FIG. 7, and the abutting portions 24b are formed to incline at a predetermined angle in the direction where the teeth 3a of an internal gear are meshed with the teeth 2a of an external gear 3a. Note, the abutting portions 24b are located at a position where a lubricant 8 exists.

When the pinion 2 and a sleeve 3 move relatively to each other in the arrangement of FIG. 8, since the abutting portions 24b stir the lubricant 8 in the direction of an arrow 25, the lubricant 8 is moved and gradually mixed as a whole. As a result, the life of the lubricant 8 can be greatly extended.

Figure 9:
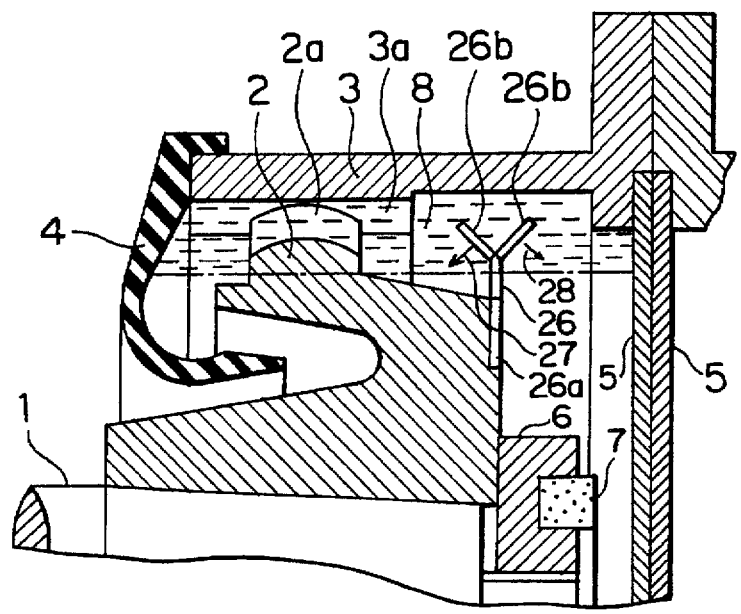
FIG. 9 is a cross sectional view showing the main portion of a eighth embodiment.
Figure 10:
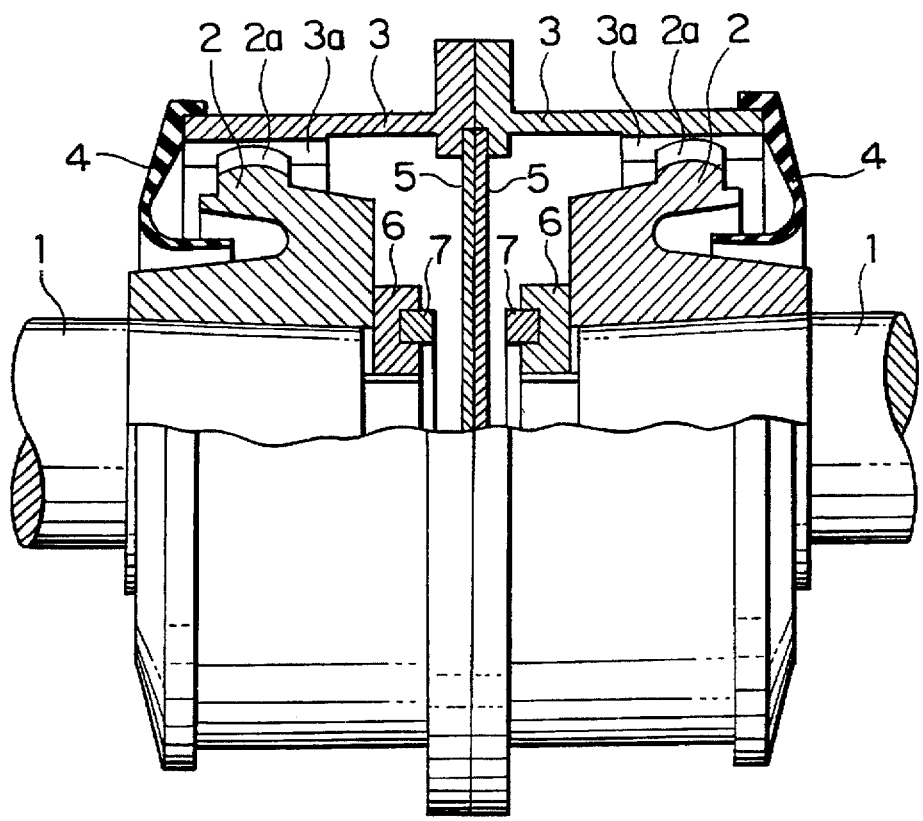
FIG. 10 is a front elevational view partly in cross section, of a prior art flexible gear coupling.

FIG. 9 is a cross sectional view showing the main portion of a eighth embodiment. In FIG. 9, numeral 26 denotes a stirring member having a fixing portion 26a fixed to an end of a pinion 2 and comb-shaped abutting portions 26b which are similar to those of FIG. 7 and alternately inclined at a predetermined angle in the direction where the teeth 3a of an internal gear is meshed with the teeth 2a of an external gear and the direction opposite to the above direction. The abutting portions 26a are disposed at a position where a lubricant 8 exists.

When the pinion 2 and a sleeve 3 move relatively to each other in the arrangement of FIG. 9, since the abutting portions 24b which are alternately disposed in opposite directions, respectively stir the lubricant 8 in the direction of an arrows 27 and 28, the lubricant 8 is moved and gradually mixed as a whole. As a result, the life of the lubricant 8 can be greatly extended.

As has been described above, according to the present invention, the lubricant is forcibly moved because the movable portions are moved by the change of the rotational speed of each of the rotary shafts by the provision of the stirring members each composed of an elastic body and having a fixing portion fixed to the sleeve in the sleeve and movable portions capable of being moved in the inner peripheral direction of the sleeve by a centrifugal force caused by the rotation of each of the rotary shafts and disposed at a position where the lubricant exists. As a result, since the entire lubricant circulates while being mixed and can be effectively used as a whole, the life of the lubricant can be expanded.

Also, according to the present invention, since the stirring member is formed to a comb shape and fixed along the inner periphery of the sleeve, the flexible gear coupling can be easily made.

In another embodiment of the present invention, the lubricant is forcibly moved because the movable portions are moved by the change of an acceleration by the provision of the stirring members each composed of an elastic body and having a fixing portion fixed to the sleeve in the sleeve and movable portions capable of being moved by an inertial force caused by the change of an acceleration produced by the rotation of each of the rotary shafts and disposed at a position where the lubricant exists. Therefore, since the entire lubricant circulates while being mixed and can be effectively used as a whole, the life of the lubricant can be expanded.

Also according to the present invention, the lubricant is forcibly moved by the abutting portions when the pinion moves in the axial direction of the sleeve and when the pinion inclines toward the axial direction at a predetermined angle by the provision of the stirring members each having a fixing portion fixed to the pinion in the sleeve and abutting portions extending from the fixing portion in the direction of the inner periphery of the sleeve and disposed at a position where the lubricant exists. Therefore, the entire lubricant circulates while being mixed and can be effectively used as a whole, so that the life of the lubricant can be expanded.

The movement of the lubricant can be further accelerated because the lubricant is stirred by the abutting portions When the pinion relatively moves or inclines with respect to the sleeve by the arrangement that the abutting portions of the stirring member are inclined at a predetermined angle in the direction where the internal gear is meshed with the external gear.

The movement of the lubricant can be further accelerated because the lubricant is stirred by the abutting portions when the pinion relatively moves or inclines with respect to the sleeve by the arrangement that the abutting portions of the stirring member are alternately inclined at a predetermined angle in the direction where the internal gear is meshed with the external gear.

What is claimed is:

1. A flexible gear coupling comprising:

a first rotary shaft;

a first pinion mounted on said first rotary shaft, said first pinion having crowned external gears;

a first sleeve having internal gears meshed with the external gear of said first pinion;

a second rotary shaft;

a second pinion mounted on said second rotary shaft, said second pinion having crowned external gears;

a second sleeve having an internal gear meshed with said external gears of said second pinion, said second sleeve being fixed to said first sleeve so that a rotational force transmitted from the first rotary shaft is transmitted to the second rotary shaft through the first pinion, first sleeve, second sleeve and second pinion;

wherein the external gears can move in the axial direction of the internal gears by a predetermined amount as well as incline toward the axial direction of the internal gears at a predetermined angle;

lubricant which fills the vicinity where the internal gears mesh with the external gears;

stirring members, each having a fixed portion fixed to one of said first and second pinions and abutting portions extending from the fixed portion in the direction of the inner periphery of the sleeves and disposed in said lubricant wherein said abutting portions move due to centrifugal force causing said lubricant to be stirred.

2. A flexible gear coupling according to claim 1, wherein said abutting portions have a free end disposed in said lubricant.

3. A flexible gear coupling according to claim 1, wherein said abutting portions extend radially outwardly.

4. A flexible gear coupling according to claim 1, characterized in that the abutting portions of said stirring member are inclined at a predetermined angle in the direction where said internal gear is meshed with said external gear.

5. A flexible gear coupling according to claim 1, characterized in that the abutting portions of said stirring member are alternately inclined at a predetermined angle in the direction where said internal gear is meshed with said external gear and the direction opposite to said direction.

* * * * *